(12) United States Patent
Nakai

(10) Patent No.: US 9,806,454 B2
(45) Date of Patent: Oct. 31, 2017

(54) GROMMET PROTECTIVE MEMBER AND ELECTRICAL WIRE CONNECTION DEVICE

(71) Applicant: SUMITOMO WIRING SYSTEMS, LTD., Yokkaichi, Mie (JP)

(72) Inventor: Hirokazu Nakai, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/655,588

(22) PCT Filed: Aug. 1, 2013

(86) PCT No.: PCT/JP2013/070868
§ 371 (c)(1),
(2) Date: Jun. 25, 2015

(87) PCT Pub. No.: WO2014/112146
PCT Pub. Date: Jul. 24, 2014

(65) Prior Publication Data
US 2015/0364856 A1 Dec. 17, 2015

(30) Foreign Application Priority Data
Jan. 16, 2013 (JP) .................... 2013-005321

(51) Int. Cl.
*H01R 13/52* (2006.01)
*H01B 17/58* (2006.01)
(Continued)

(52) U.S. Cl.
CPC ..... *H01R 13/5205* (2013.01); *B60R 16/0222* (2013.01); *H01B 17/583* (2013.01);
(Continued)

(58) Field of Classification Search
CPC ............ H01R 13/5205; H01R 13/5202; H01R 13/5219; H01R 2201/26; H01B 17/583; B60R 16/0222
See application file for complete search history.

(56) References Cited

U.S. PATENT DOCUMENTS 5,639,993 A * 6/1997 Ideno .................. B60R 16/0222
174/153 G
5,925,851 A * 7/1999 Sugahara ........... H01R 13/5208
174/152 G
(Continued)

FOREIGN PATENT DOCUMENTS

JP H11-233191 A 8/1999
JP 2003-230214 A 8/2003
(Continued)

OTHER PUBLICATIONS

Sep. 24, 2013 International Search Report issued in International Application No. PCT/JP2013/070868.

*Primary Examiner* — Edwin A. Leon
*Assistant Examiner* — Oscar C Jimenez
(74) *Attorney, Agent, or Firm* — Oliff PLC

(57) ABSTRACT

An electrical wire connection device is provided with: a shield shell, one end side having a connection part for inserting an electrical wire, the other end side having a cap part that can be mounted on a casing; a grommet including a soft material, having formed at one end side an extension cylinder part through which an electrical wire can be passed, and having formed at the other end side a skirt part fitted into the shield shell from the connection part side and fitted to the outer peripheral surface of a step part; and a grommet protective member formed of material harder than the grommet and arranged surrounding the skirt part from the outer peripheral surface side, a flange part being formed on the inner peripheral surface of the grommet protective member and pressing against the outer peripheral surface of the grommet.

9 Claims, 10 Drawing Sheets

(51) Int. Cl.
  *H01R 13/6581* (2011.01)
  *B60R 16/02* (2006.01)
  *H01R 13/6596* (2011.01)
  *H01R 13/6592* (2011.01)
  *H01R 13/74* (2006.01)
  *H02G 3/22* (2006.01)

(52) U.S. Cl.
  CPC ..... *H01R 13/6581* (2013.01); *H01R 13/6592* (2013.01); *H01R 13/6596* (2013.01); *H01R 13/748* (2013.01); *H02G 3/22* (2013.01)

(56) References Cited

U.S. PATENT DOCUMENTS

| | | | | |
|---|---|---|---|---|
| 6,561,835 | B1 * | 5/2003 | Hirschberg | H05K 7/1452 439/341 |
| 6,814,617 | B2 * | 11/2004 | Oota | H01R 13/5205 174/365 |
| 6,815,610 | B2 * | 11/2004 | Kuboshima | H01R 9/032 174/360 |
| 6,963,030 | B2 * | 11/2005 | Matsui | B60R 16/0222 16/2.1 |
| 7,476,121 | B2 * | 1/2009 | Tsuji | H01R 13/4223 439/465 |
| 7,614,915 | B2 * | 11/2009 | Kamenoue | B60R 16/0222 439/623 |
| 8,152,537 | B1 * | 4/2012 | Montena | H01R 4/646 439/98 |
| 2012/0270444 | A1 | 10/2012 | Kawamura | |
| 2013/0052890 | A1 * | 2/2013 | Nooner | H01R 13/5213 439/892 |
| 2014/0054064 | A1 * | 2/2014 | Gronowicz, Jr. | B60R 16/0222 174/152 G |

FOREIGN PATENT DOCUMENTS

| | | |
|---|---|---|
| JP | 2007-087874 A | 4/2007 |
| JP | 2012-191822 A | 10/2012 |
| JP | 2012-226948 A | 11/2012 |

* cited by examiner

GROMMET PROTECTIVE MEMBER AND ELECTRICAL WIRE CONNECTION DEVICE

TECHNICAL FIELD

The present invention relates to a grommet protection member and an electric wire connection device.

BACKGROUND ART

One example of known electric wire connection devices is shown in Patent Document 1 (JP 2003-230214A). In this device, an electric wire group is passed in a sealed state through a hole that penetrates a wall. In particular, a grommet through which the electric wire group (wire harness) is inserted is attached to the wall provided with a through hole, and a flexible lip having a large diameter that is provided in the grommet is brought into elastic contact with the periphery of the through hole to seal the through hole.

SUMMARY OF THE INVENTION

Technical Problem

On the other hand, in hybrid vehicles or the like, the wire harness is routed between a motor and a battery, for example. The wire harness is introduced into a motor case through a hole penetrating the case. However, even when the above-described conventional sealing structure is used for this structure, it may not be necessarily sufficient as a sealing structure. This is because it is necessary to be prepared for the case that high-pressure washing water is blown to wash automobiles including hybrid vehicles. In such a case, in the above-described sealing structure, as the lip is exposed on the surface, if high-pressure washing water is blown to the edge of the lip, there is a concern that the edge turns up, thus reducing the sealing performance.

The present invention was made based on the foregoing circumstances, and it is an object thereof to provide an electric wire connection device that can achieve high water resistance with a small number of components and provide a grommet protection member used therewith.

Solution to Problem

A grommet protection member of disclosed embodiments is attached to an end portion of a grommet made of a soft material, the grommet being fitted to come into direct contact with an outer circumferential surface of an attachment member, wherein:
the grommet protection member is made of a material that is harder than the soft material of the grommet and is attached to surround, from an outer circumferential surface side, an end portion of the part of the grommet that is fitted to the attachment member, and a flange is integrally formed on an inner circumferential surface of the grommet protection member projecting therefrom, the flange compressing the grommet along the entire circumference of the grommet.

An electric wire connection device of the disclosed embodiments includes: an attachment member including, at one end, a tubular connecting portion that has an opening through which electric wires can be inserted and, on the other end, an attached portion capable of being attached to an attachment destination member; a grommet made of a soft material and formed into a tubular shape, the grommet covering the attachment member in direct contact therewith; and the grommet protection member as defined above that surrounds the part of the grommet covering the attachment member, the grommet protection member integrally including a flange that compresses an entire outer circumferential surface of the grommet.

Advantageous Effects of the Invention

According to aspects of the present invention, the grommet protection member covers the end portion of the grommet to prevent the end portion from being directly exposed to high-pressure washing water, thus contributing to the preservation of the sealing performance.

Moreover, the flange of the grommet protection member is capable of compressing the part of the grommet fitted to the attachment member from around the entire circumference. That is, the flange integrally formed on the grommet protection member has the capability of tightening the grommet without using a dedicated fastening component, such as a band. Accordingly, an increase in the number of components can be avoided by omitting a dedicated fastening component.

DESCRIPTION OF EMBODIMENTS

Figure 1:
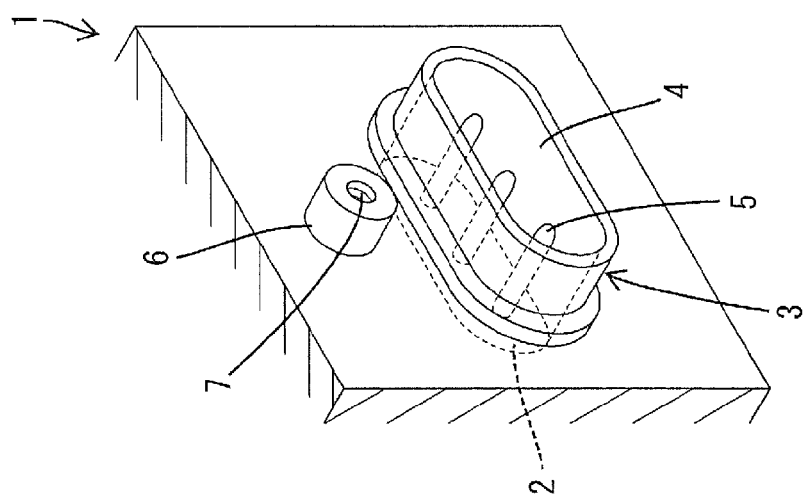
FIG. 1 is an exploded perspective view illustrating a connection between an end portion of a wire harness and a casing.
Figure 1:
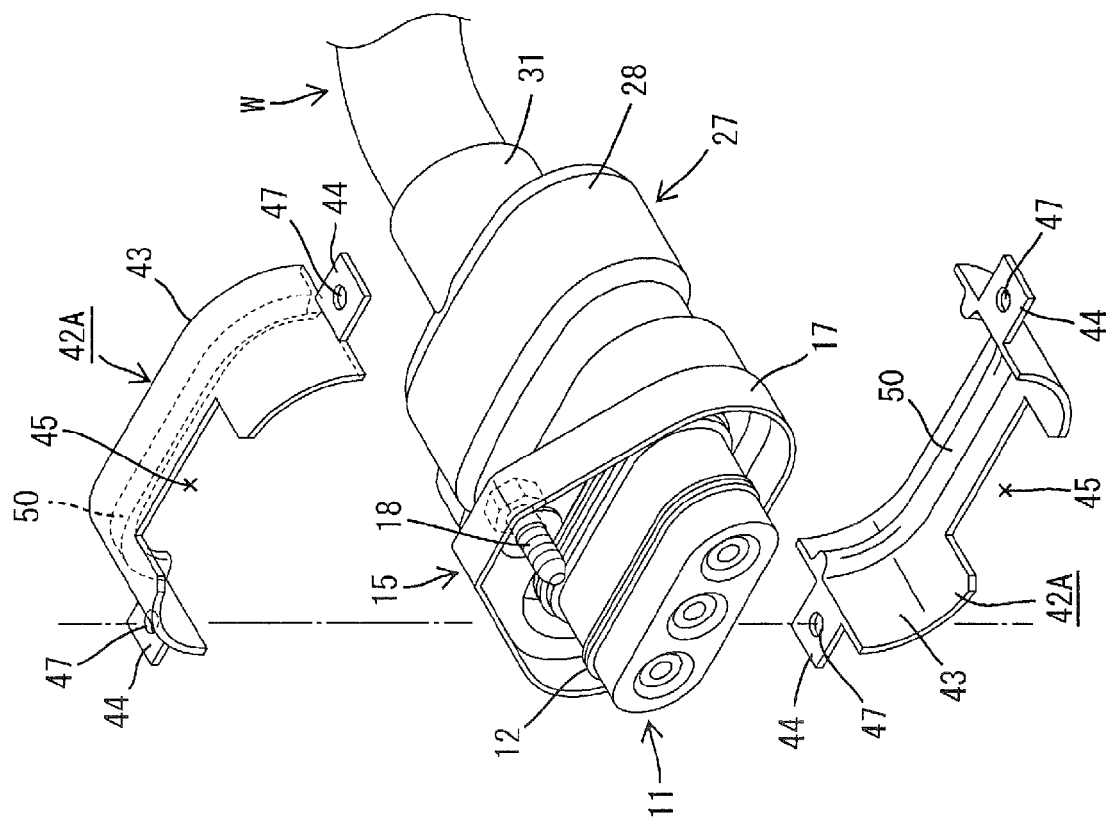

Preferred embodiments of the present invention will be described.

A grommet protection member according to the present invention may be provided with a drain opening for draining water entering between the grommet protection member and a grommet.

According to this configuration, water entering between the grommet protection member and the grommet can be quickly drained without retaining it.

The grommet protection member may be provided with a pair of segments that is divided in radial direction in at least one location so as to be capable of being opened, and link portions are provided at open ends of the two segments so that the segments are capable of being linked to each other such that the segments can be held in an annular shape that can surround the outer circumferential surface of the grommet.

According to this configuration, as the grommet protection member is formed by the segments that can be opened and closed, the operation of surrounding the outer circumferential surface of the grommet can be performed easily and smoothly.

In addition, preferably, the grommet protection member comprises two separate segments that are divided in radial direction at two locations together with the flange, and the link portions linking the two segments are formed at the two divided locations, and upon attachment to the grommet, the two segments are joined together so that the flange continues in circumferential direction. According to this configuration, as the grommet protection member is divided, it can be easily attached to the grommet, and as the flange is circumferentially continuous, it can provide sealing in the circumferential direction without a break.

Moreover, the segments are preferably provided with an identical shape.

According to this configuration, as no orientation is set for joining the segments, workability is improved.

Furthermore, outwardly extending link portions may be formed on both end portions of both segments such that the segments can be linked together by fastening screws.

According to this configuration, the segments can be securely tightened against the elasticity of the grommet by fastening the link portions with the screws.

Furthermore, in an electric wire connection device according to another invention, sealing lips may be formed circumferentially on an inner circumferential surface side of the grommet that opposes the attachment member, the sealing lips being capable of coming into direct contact with an outer circumferential surface of the attachment member, and upon attachment of a grommet protection member to the grommet, the sealing lips may be positioned in a portion immediately below a flange.

According to this configuration, as the flange of the grommet protection member compresses the portion above the sealing lips, the sealing function can be effectively enhanced.

Moreover, in the electric wire connection device, auxiliary lips may be provided circumferentially on the inner circumferential surface side of the grommet outside of a region tightened by the flange, the auxiliary lips being provided in locations between which the sealing lips are interposed in a front-rear direction.

According to this configuration, even if the seal lips may deteriorate over time by receiving the tightening force of the flange, the sealing function can be preserved for a long period of time as the auxiliary lips are provided outside of the region tightened by the flange.

Hereinafter, Embodiments 1 and 2, which embody an electric wire connection device of the present invention, will be described with reference to the drawings. It should be noted that in the description below, the terms "front and rear" are defined so that a direction of moving away from a casing is "rear" and a direction of approaching the casing is "front".

Embodiment 1

FIGS. 1-9 show Embodiment 1 of the present invention. More specifically, the battery power of a hybrid vehicle is supplied to a motor via an inverter. A bundle of a plurality of electric wires (wire harness) is used as the power feeder therebetween. FIG. 1 shows an electric wire connection device of Embodiment 1, illustrating a connection on an inverter side.

Casing 1

Figure 2:
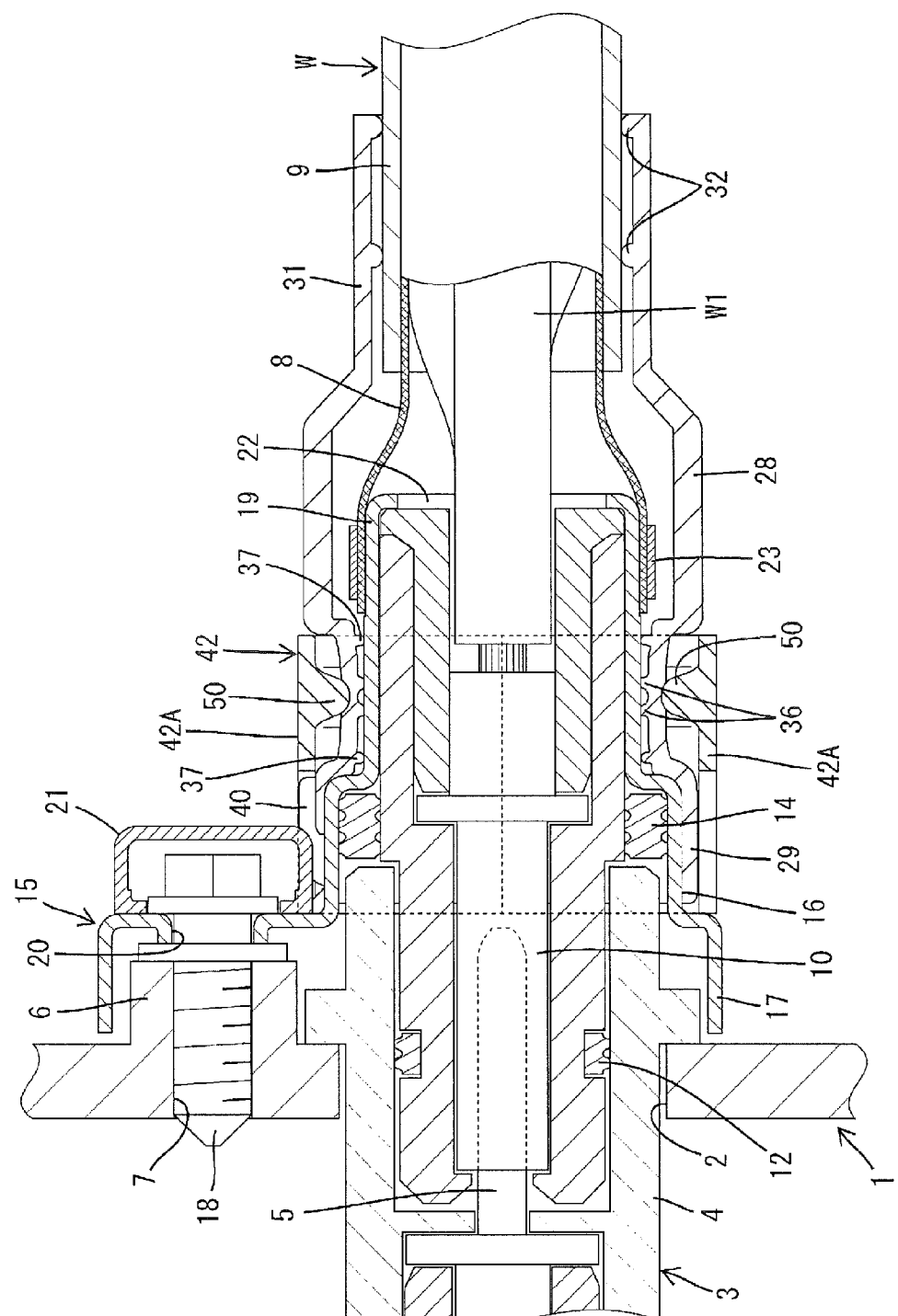
FIG. 2 is a cross-sectional side view illustrating a state where the end portion of the wire harness is connected to the casing.

As shown in FIG. 1 and FIG. 2, a through hole 2 is opened at a connecting portion of the casing 1 (made of metal) on the inverter side, and a casing-side connector 3 is attached to the inside of the through hole 2, projecting outward. A hood portion 4 of the casing-side connector 3 is formed in an oval shape that is elongate in the width direction, and three male terminal fittings 5 are accommodated in the hood portion 4 and are arranged in a row in the width direction. Moreover, a boss portion 6 projects rearward from the portion above the through hole 2 on the front wall of the casing 1, and a bolt hole 7 (screw hole) is provided at the central portion of the boss portion 6.

In this embodiment, the wire harness W includes three electric wires. As shown in FIG. 2, the electric wires W1 included in the wire harness W are collectively covered from the outside with a braided wire 8 and an outer cover 9 that is located outside the braided wire 8. Moreover, a female terminal fitting 10 is connected to the end of each electric wire W1. The female terminal fittings 10 are respectively accommodated in corresponding cavities in a harness-side connector 11. The harness-side connector 11 is formed to be capable of being fitted to the hood portion 4 of the casing-side connector 3, and the male and female terminal fittings 5 and 10 are electrically connected to each other in a proper fitting state. Moreover, a first sealing ring 12 is fitted to a portion on the front end portion side of the outer circumferential surface of the harness-side connector 11, and thus being capable of coming into direct contact with the inner circumferential surface of the hood portion 4 and providing sealing between both portions. A step 13 is formed at an intermediate portion in the longitudinal direction on the outer circumferential surface of the harness-side connector 11, and a second sealing ring 14 is fitted to a portion near the border of the step 13. The second sealing ring 14 comes into direct contact with the inner circumferential surface of a step portion 16 of a shielding shell 15 (attachment member), which will be described immediately below, in a water-tight state.

Shielding Shell 15

Figure 3:
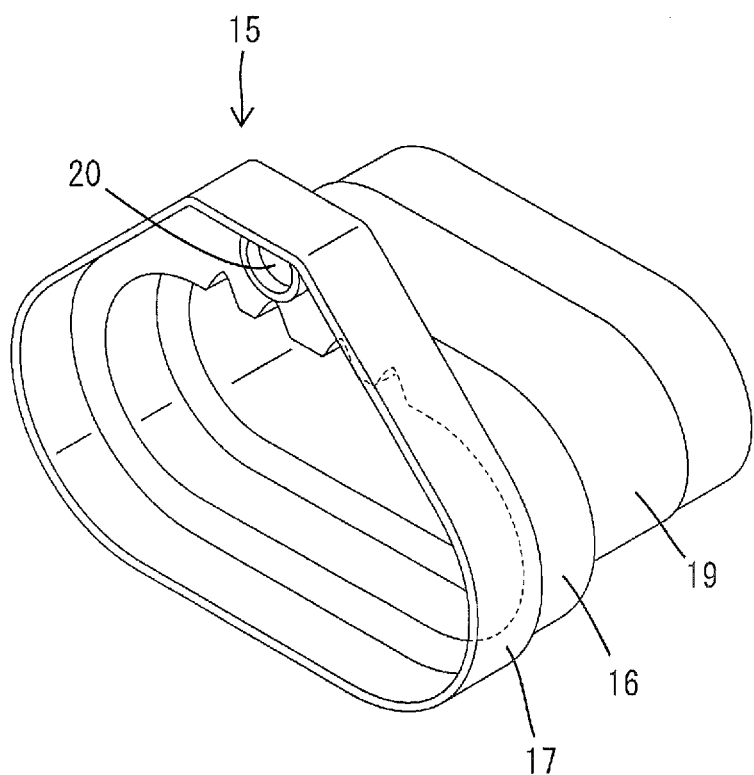
FIG. 3 is a perspective view of a shielding shell.
Figure 4:
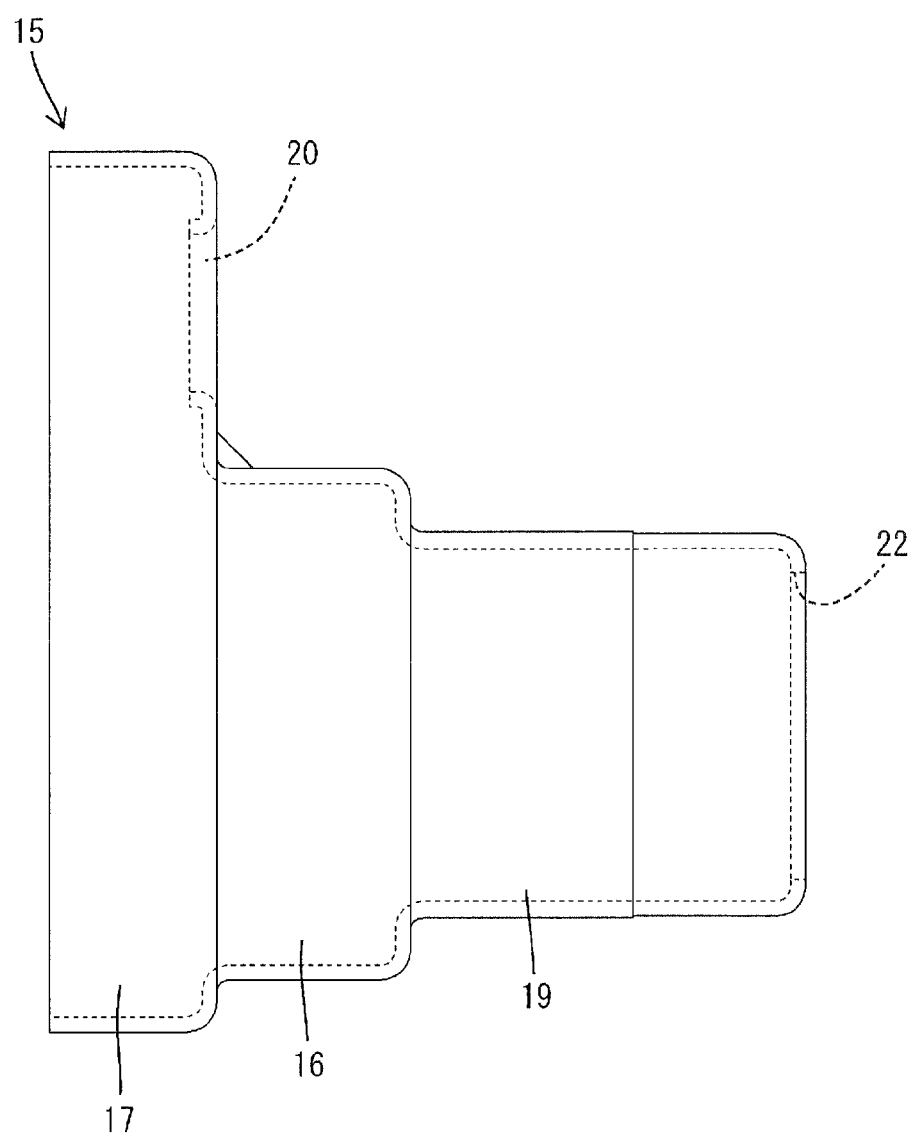
FIG. 4 is a side view of the shielding shell.

The wire harness W is inserted through the shielding shell 15 as shown in FIG. 2, and the harness-side connector 11 is accommodated in the shielding shell 15 in a state where the harness-side connector 11 projects forward from the shielding shell 15. A metal plate is formed into a tubular shape as the shielding shell 15, and as shown in FIG. 3 and FIG. 4, the front end portion thereof is provided with a cap portion 17 (attached portion) for attachment to the casing 1. As shown in FIG. 1 and FIG. 3, the cap portion 17 is open toward the casing 1 side, and has a substantially mountain-like shape in which the center on the upper end side in the drawing is a peak. An insertion hole 20 is formed in the peak portion of the cap portion 17, and a fixing bolt 18 is inserted into the insertion hole 20, penetrating from the rear surface side. Additionally, the shielding shell 15 is fixed to the casing 1 by screwing the fixing bolt 18 into the bolt hole 7 on the casing 1 side.

Figure 7:
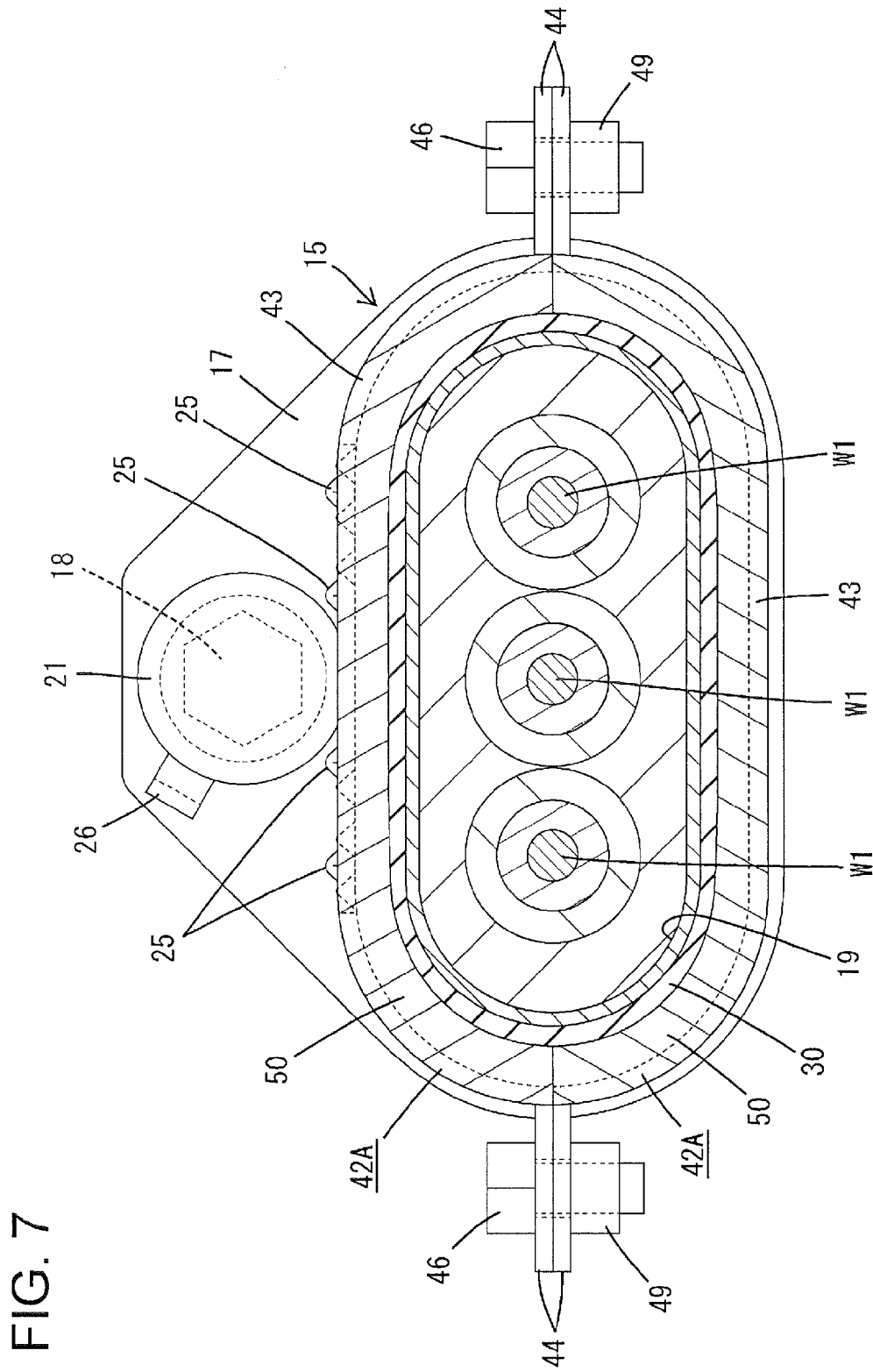
FIG. 7 is a cross-sectional view taken along line A-A shown in FIG. 6.

It should be noted that as shown in FIG. 7, the head of the bolt 18 is removably covered with a bolt cap 21 after the bolt 18 is screwed in. In this embodiment, the bolt cap 21 is connected, via a string-shaped hinge piece 26, to an attachment tool (not shown) that is fixed together with the bolt 18.

As shown in FIG. 4, the step portion 16 extends rearward from the cap portion 17, and a connecting portion 19 extends further rearward from the step portion 16. Both the connecting portion 19 and the step portion 16 are formed to have an oval cross section that is elongate in the width direction (horizontal direction). An opening 22 is formed on the rear end surface of the connecting portion 19, and the wire harness W can be inserted through the opening 22 (see FIG. 2). As shown in FIG. 2, the outer circumferential surface of the rear end portion of the connecting portion 19 is covered with the braided wire 8. An annular fastening tool 23 is tightened with a screw or the like, and thus the braided wire 8 is fastened and fixed to the connecting portion 19.

Figure 6:
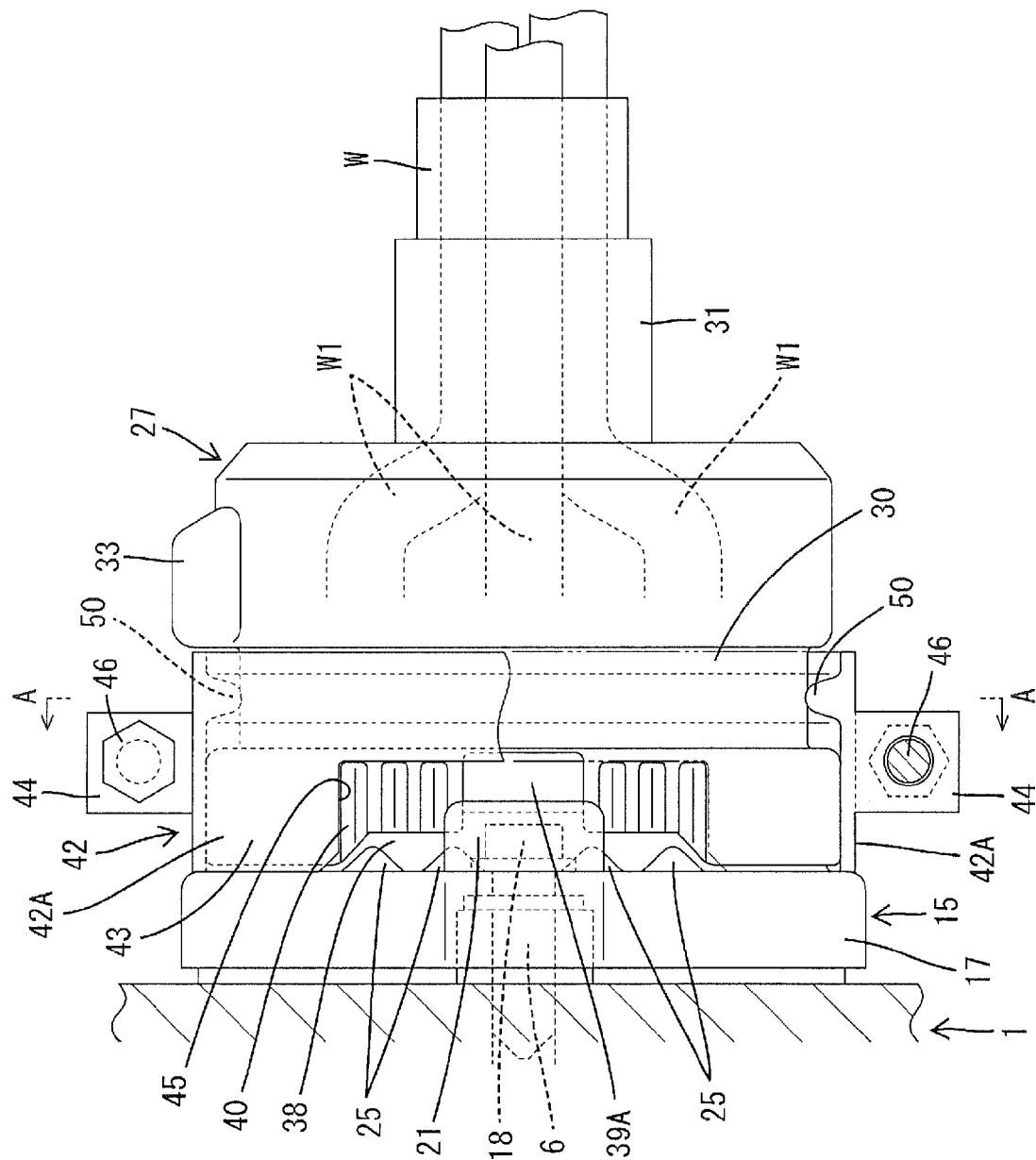
FIG. 6 is a partially cutaway top view illustrating a state where the end portion of the wire harness is connected to the casing.

The step portion 16 is disposed coaxially with respect to the connecting portion 19. The step portion 16 is formed to be slightly larger than the connecting portion 19, having an oval cross section, and is shorter in the front-rear direction than the connecting portion 19. The step portion 16 is continuous with the height position on the lower end portion side of the cap portion 17, and the above-described bolt 18 is disposed at the height position spaced apart from the upper surface of the step portion 16. As shown in FIG. 6 and FIG. 7, two reinforcing ribs on both sides interposing the bolt 18 in the width direction as seen in a plan view, that is, four reinforcing ribs 25 in total, are formed by striking so as to project rearward from the rear surface of the cap portion 17 at the border portion with the upper surface of the step portion 16. As shown in FIG. 2, the second sealing ring 14 of the harness-side connector 11 is caused to abut against the step between the step portion 16 and the connecting portion 19, and thereby the harness-side connector 11 is positioned in the front-rear direction.

Grommet 27

Figure 5:
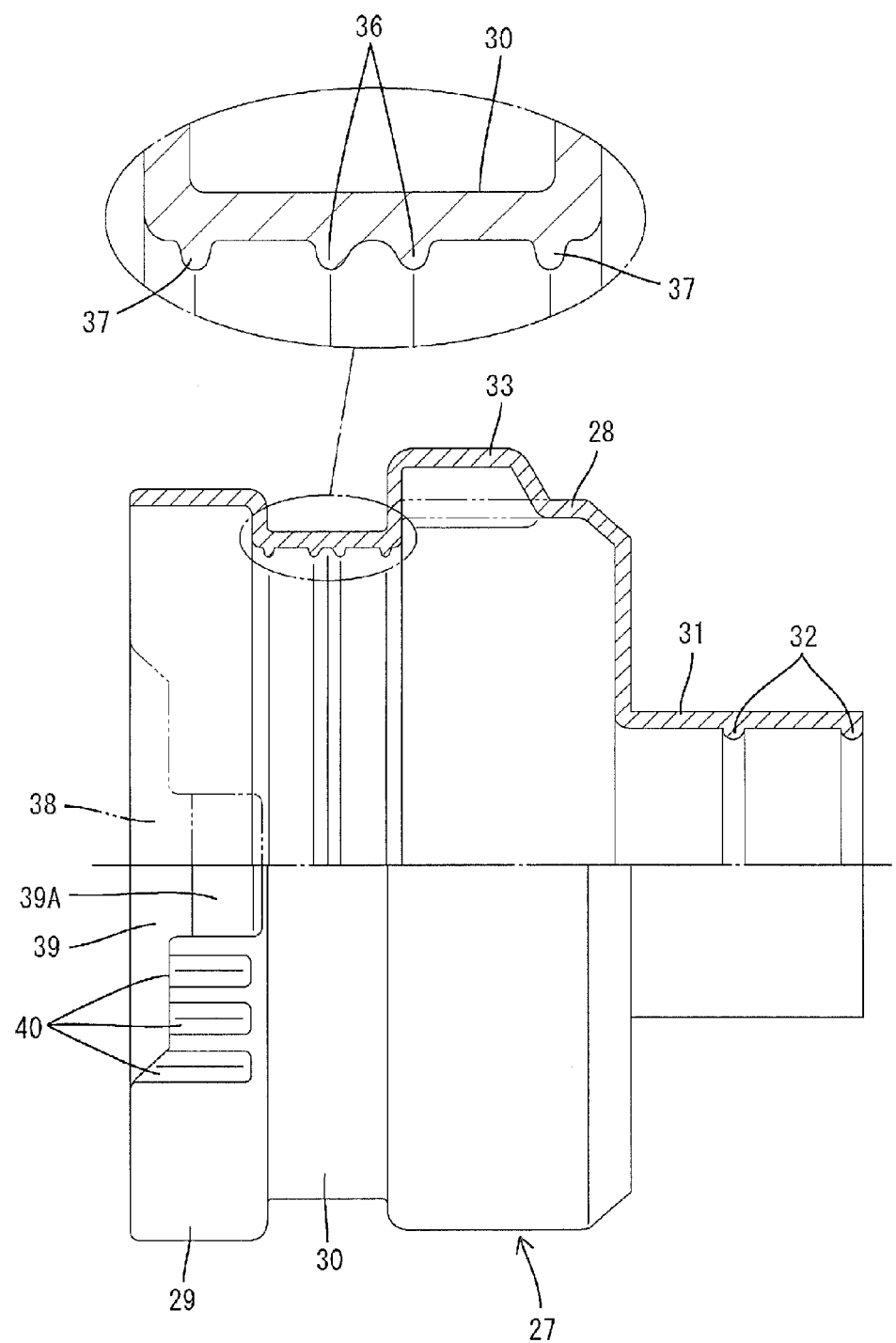
FIG. 5 is a half cross-sectional top view of a grommet.

A grommet 27 is made of a single piece of an elastic soft material (rubber material) in a hollow shape. As shown in FIG. 5, the grommet 27 is configured to include a main portion 28, a skirt portion 29, and a pressure attachment portion 30 interposed therebetween. The main portion 28 has an extending tubular portion 31 that extends rearward. The extending tubular portion 31 is formed in a cylindrical shape through which the wire harness W can be inserted, and is formed coaxially with the axis of the entire grommet 27. As shown in FIG. 2, sealing edges 32 are formed along the entire circumferences at the opening edge and the position entering forward from the opening edge on the inner circumferential surface of the extending tubular portion 31.

The main portion 28 is formed to have an oval cross section that can be matched with the outer circumferential surface of the connecting portion 19 of a shielding case, and the main portion 28 is formed so as to be capable of surrounding the entire outer circumferential surface of the front half portion of the connecting portion 19 in a state where the grommet 27 covers the shielding shell 15.

It should be noted that as shown in FIG. 5 and FIG. 7, an expanded portion 33 is formed at the position on the pressure attachment portion 30 side on the outer side surface of the main portion 28, expanding outward in the width direction. The inside of the expanded portion 33 is a space for accommodating a fastening portion (portion fastened by a screw or the like) of the fastening tool 23 that fastens the above-described braided wire 8 to the connecting portion 19 of the shielding shell 15.

The pressure attachment portion 30 is formed in a recess groove shape and connects the skirt portion 29 and the main portion 28. Accordingly, its cross section has an oval shape that is slightly smaller than the main portion 28. The outer circumferential surface of the pressure attachment portion 30 is fastened by a grommet protection member 42, which will be explained below. In the pressure attachment portion 30, both border walls on the connecting portion 19 side and the skirt portion 29 side have a substantially vertically rising shape.

As shown in FIG. 2, a pair of sealing lips 36 that are spaced apart from each other in the front-rear direction projects from the central portion of the entire inner circumferential surface of the pressure attachment portion 30. As described below, both sealing lips 36 are positioned substantially immediately below a flange 50 of the grommet protection member 42 when the grommet protection member 42 is attached. Upon attachment of the grommet protection member 42, both sealing lips 36 are moderately squeezed and come into direct contact along the outer circumferential surface of the front half portion of the connecting portion 19 of the shielding shell 15.

As shown in FIG. 5, a pair of auxiliary lips 37 is formed at positions close to both front and rear end portions of the inner circumferential surface of the pressure attachment portion 30, projecting from the entire inner circumferential surface. As shown in the drawing, the projecting height of the auxiliary lip 37 is set to substantially the same height as that of the sealing lip 36. As the auxiliary lip 37 is sufficiently spaced apart in the front-rear direction from the position immediately below the flange 50 of the grommet protection member 42, in a state where the grommet protection member 42 fastens the auxiliary lip 37 as described below, the squeezed amount of the auxiliary lip 37 is smaller than that of the sealing lip 36. However, the auxiliary lip 37 correspondingly has an excellent durability compared with the sealing lip 36, and it can be expected to maintain the sealing performance for a long period of time.

The grommet 27 of this embodiment has a shape in which the skirt portion 29 extends further forward from the pressure attachment portion 30. The skirt portion 29 is open forward, and is formed to have an oval cross section that can be fitted to the outer circumferential surface of the step portion 16 of the shielding shell 15. The skirt portion 29 is formed to come into direct contact along the outer circumferential surface of the step portion 16 together with the rising wall rising from the pressure attachment portion 30 in a state where the grommet 27 is attached to the shielding shell 15.

Moreover, the skirt portion 29 excluding a part of its upper surface is formed to have substantially the same front-rear width as the front-rear width of the step portion 16. As shown in FIG. 5 and FIG. 6, a cut-out portion 38 is formed at the front edge portion of the region near the central portion of the upper surface of the skirt portion 29, that is, the region in which the above-described reinforcing ribs 25 of the shielding shell 15 are formed, in order to prevent interference with the reinforcing ribs 25. The central portion in the width direction of the front edge of the cut-out portion 38 is provided with a recess 39 by cutting out a range of a predetermined width. The recess 39 is for preventing interference with the bolt cap 21, and a thin portion 39A that is thinner than its surroundings (by thinning the outer surface side) is formed in a region on the front side of the portion in which the recess 39 is formed.

Two turn-up preventing ribs 40 are formed on both sides interposing the recess 39 of the cut-out portion 38 in the width direction. The turn-up preventing ribs 40 are each formed in the front-rear direction in a range extending from the front edge to the rear edge of the cut-out portion 38.

Grommet Protection Member 42

Next, the grommet protection member 42 will be described. By surrounding the entire outer circumferential surfaces of the skirt portion 29 of the grommet 27 and the pressure attachment portion 30, the grommet protection member 42, can protect the outer circumferential surfaces of the skirt portion 29 and the pressure attachment portion 30 from high-pressure washing water and prevent the opening edge of the skirt portion 29 of the grommet 27 from turning up. Moreover, in addition to the above-described function, the grommet protection member 42 has the function of fastening the skirt portion 29 of the grommet 27.

As shown in FIG. 1, the grommet protection member 42 of Embodiment 1 is configured to include a pair of segments 42A that are both formed into an identical shape. Both segments 42A are formed of a resin plate that is harder than the material of the grommet 27. Both segments 42A are formed to have a protection portion 43, a pair of link portions 44 extending outward in the width direction from both ends of the protection portion 43, and a flange 50 that is formed to project from the inner circumferential surfaces of both segment 42A.

As shown in FIGS. 2 and 6, the protection portions 43 of both segments 42A have a front-rear width that is approximately equal to or slightly shorter than the length from the front edge of the skirt 29 of the grommet 27 to the rear edge of the pressure attachment portion 30, and the segments 42A are formed into a shape that conforms to the shape of the outer circumferential surface of the grommet 27. As shown in FIG. 2, in a state where the grommet protection member 42 is attached to the grommet 27, the inner surfaces of the protection portions 43 of both segments 42A are in approximately direct contact along the outer circumferential surface of the skirt portion 29, and the front edges thereof are positioned slightly forward of the front edge of the skirt portion 29 and adapted to approximately abut against the rear surface of the cap portion 17 of the shielding shell 15.

Figure 8:
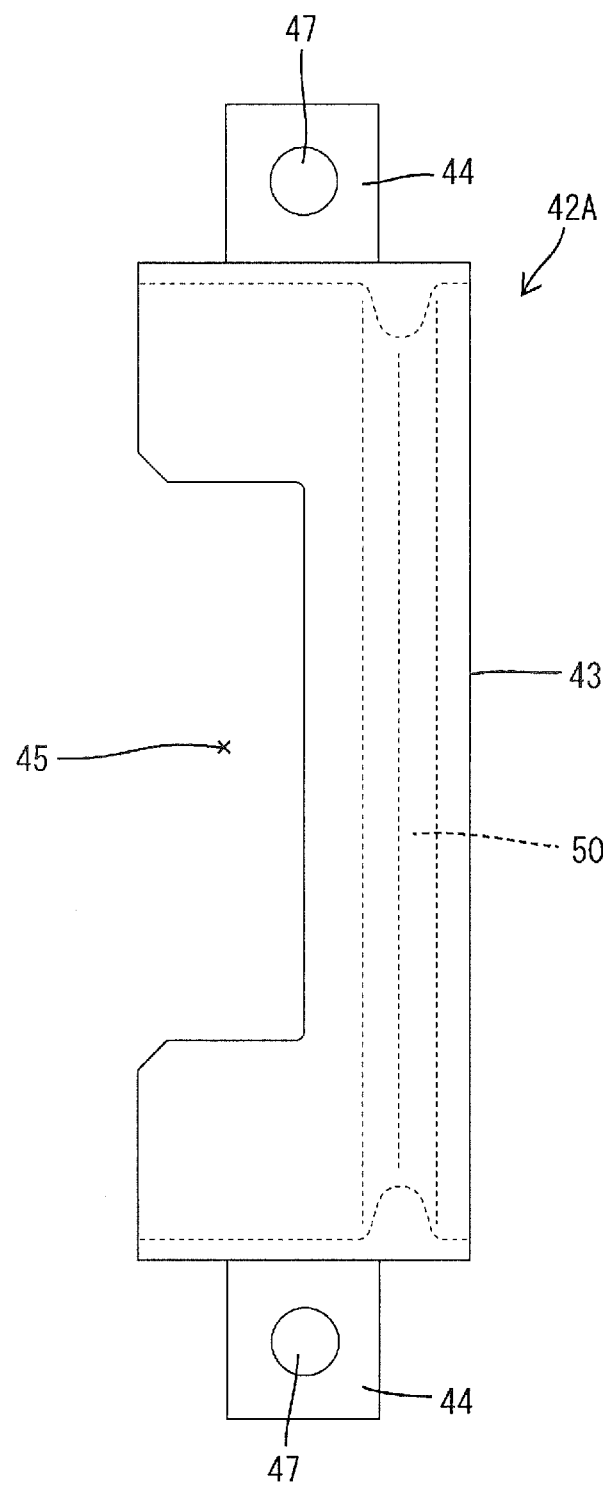
FIG. 8 is a plan view of a grommet protection member.
Figure 9:
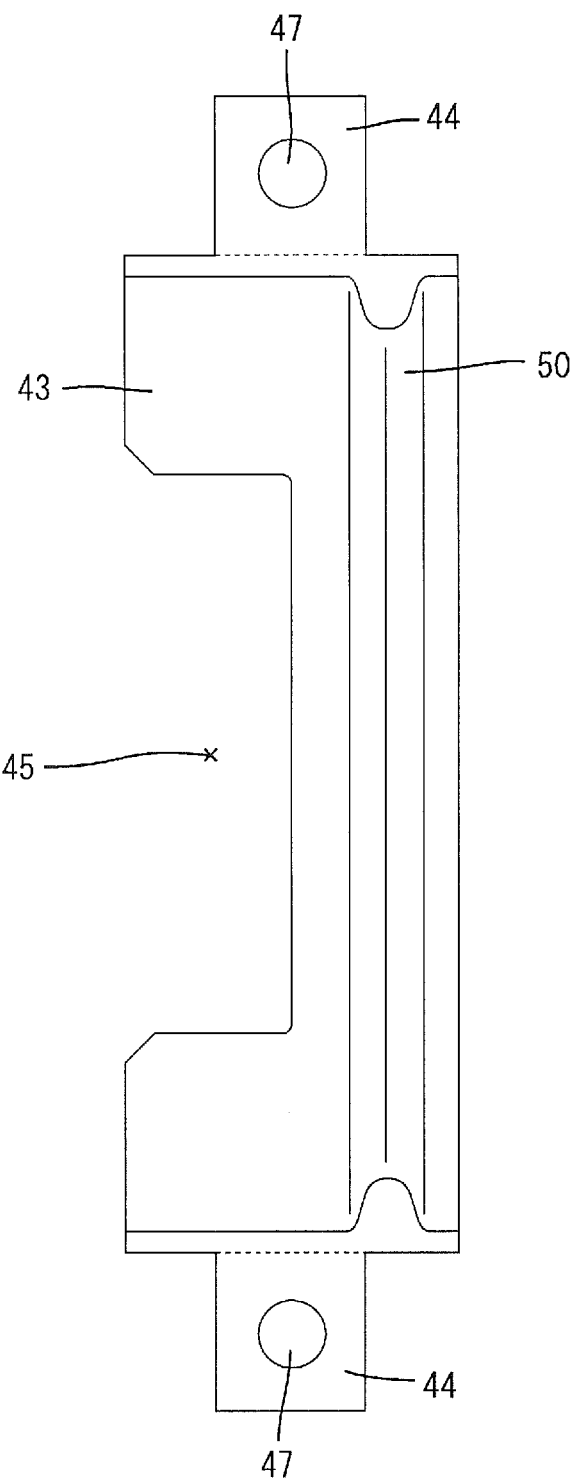
FIG. 9 is a bottom view of the grommet protection member.

As shown in FIGS. 8 and 9, when joined together, both segments 42A surround the skirt portion 29 and the pressure attachment portion 30 of the grommet 27, coming into direct contact along the entire circumferential surfaces of the portions. The front edge portion of the protection portion 43 of the segment 42A is cut out to form a drain opening 45. The drain opening 45 drains water entering between the grommet protection member 42 and the grommet 27 and prevents the inside of the grommet protection member 42 from being filled with water. The dimension in the width direction of the drain opening 45 is set to be approximately the same as the width dimension of the cut-out portion 38 of the grommet 27, and its dimension in the depth direction (front-rear direction) is set to be approximately the same as the length dimension from the front edge of the skirt portion 29 of the grommet 27 to the rear edge of each turn-up preventing rib 40. As shown in FIG. 6, in a state where the grommet protection member 42 is attached to the grommet 27, the drain opening 45 is matched with the region in which the turn-up preventing ribs 40 of the grommet 27 are formed to expose the entire region.

On the other hand, the link portions 44 are formed to protrude from the approximately central portions of both edges of the protection portion 43. A through hole 47 penetrates the central portion of each link portion 44 to pass a bolt 46 therethrough.

In a state where both segments 42A are joined together from the upward and downward directions, both protection portions 43 form a loop having an oval shape, surrounding the entire outer circumferential surfaces of the skirt portion 29 and the pressure attachment portion 30 of the grommet 27. Moreover, in a state where both segments 42A are joined, the through holes 47 of the corresponding link portions 44 are aligned with each other, and both segments 42A are held in a joined state with bolts 46 and nuts 49.

Furthermore, as shown in FIG. 1, FIG. 9, etc., the flange 50 is integrally formed on the inner surfaces of the protection portions 43 of both segments 42A. The flange 50 is formed circumferentially along the entire length of the segments 42A, protruding from a position on the rear edge of the segments 42A rear of the link portions 44. Both end surfaces of the flange 50 are formed into flat surfaces that are flush with both end surfaces of the protection portion 43. Accordingly, in a state where both segments 42A are joined together, the end surfaces of both segments 42A are brought into abutment with each other, while the corresponding end surfaces of the flange 50 are brought into alignment and abutment with each other. As a result, in the joined state, the flange 50 continuously surrounds the entire outer circumferential surface of the attachment pressure portion 30 of the grommet 27 in the same plane. As previously described, when the grommet protection member 42 is attached to the grommet 27, the flange 50 is positioned on the outer circumferential surface of the pressure attachment portion 30 of the grommet 27 so that the sealing lips 36 are approximately immediately below the flange 50. In particular, the flange 50 is adapted to pressure the area between both sealing lips 36. Moreover, the protruding height of the flange 50 is set to be able to come into contact with and press against the outer circumferential surface of the pressure attachment portion 30 of the grommet 27 so as to properly compress the sealing lips 36 once the grommet protection member 42 is attached to the grommet 27. The flange 50 is formed to have a curved shape with a protruding rounded edge.

Next, the effects of this Embodiment 1 configured as described above will be described. An example of operations for connecting the end portion of the wire harness W to the casing 1 is described. First, the harness-side connector 11, the shielding shell 15, and the grommet 27 are attached to the end portion of the wire harness W (as shown in FIG. 1). To attach the grommet 27, the skirt portion 29 is fitted to come into direct contact with the outer circumferential surface of the step portion 16 of the shielding shell 15 so that the recess 39 of the grommet 27 is positioned below the insertion hole 20 of the shielding shell 15.

Subsequently, one of the segments 42A of the grommet protection member 42 is matched with the skirt portion 29 and the pressure attachment portion 30 of the grommet 27 from below, and the other segment 42A is fitted from the above. Then, the corresponding link portions 44 of both segments 42A are aligned with each other. Next, the bolts 46 and the nuts 49 are tightened via the through holes 47 to hold both segments 42A in a joined state. At this point, the front edge of the grommet protection member 42 is aligned with or slightly forward of the front edge of the skirt portion 29 of the grommet 27, thereby ensuring that the front edge portion of the grommet 27 is covered with the grommet protection member 42. In this way, as the grommet protection member 42 is split into two pieces in a radial direction (vertical direction) in this Embodiment 1, the grommet protection member 42 can be easily attached to the grommet 27.

Moreover, upon joining of both segments 42A, the flange 50 of the grommet protection member 42 assumes a circumferentially continuous form to come into contact with and press against the entire outer circumferential surface of the pressure attachment portion 30 of the grommet 27. At this point, as the shielding lips 36 are positioned approximately directly below the flange 50, the shielding lips 36 are properly compressed around their entire circumferences so as to be in direct contact with the outer circumferential surface of the connecting portion 19 of the grommet 27 in a water-tight manner.

The harness-side connector 11 and the casing-side connector 3 are then fitted to each other. In that process, the cap portion 17 of the shielding shell 15 is caused to hit against the wall surface of the casing 1, concealing the projecting portion of the casing-side connector 3 and the boss portion 6. When the bolt 18 is screwed into the bolt hole 7 of the boss portion 6 in this state, the shielding shell 15 is fixed, and the operations for connecting the end portion of the wire harness W to the casing 1 side are completed.

Incidentally, as previously described, high-pressure washing water is sometimes blown to the portion in which the end portion of the wire harness W is connected to the casing 1. In this Embodiment 1, as a measure taken against that, first, the flange 50 is integrally formed on the grommet protection member 42 so as to be able to reliably cut off water between the grommet 27 and the shielding shell 15. If a dedicated fastening component, such as a bundling band, is employed to seal the grommet 27 to the shielding shell 15, the number of components is increased, and the number of operations is also increased due to the addition of the tightening operation. In that regard, in this embodiment, as the flange 50 is integrally formed on the grommet protection member 42, the number of components does not increase. Moreover, as the sealing between the shielding shell 15 and the grommet 27 is completed simultaneously with the operation of attaching the grommet protection member 42 to the grommet 27, the work efficiency is increased without increasing the number of operations. Furthermore, as the sealing lips 36 are positioned approximately directly below the flange 50, the flange 50 can be reliably caused to compress the sealing lips 36.

Moreover, the end portion of the grommet 27 is surrounded by and covered with the grommet protection member 42. More specifically, the grommet protection member 42 conceals the entire circumference of the front-rear range of the grommet 27 that extends from the front edge of the skirt portion 29 nearly to the rear edge of the pressure attachment portion 30. Accordingly, as the skirt portion 29 and the pressure attachment portion 30 of the grommet 27 are not directly exposed to high-pressure washing water, such that the front edge of the skirt portion 29 of the grommet 27 can be prevented from turning up. Moreover, during washing, high-pressure washing water enters the inside of the grommet protection member 42 through the gap between the pressure attachment portion 30 and the grommet protection member 42. However, as the water is smoothly drained through the drain openings 45, the situation in which the sealing is reduced due to the pressure of water filled in the inside of the grommet protection member 42 can be avoided.

Furthermore, in the grommet 27 of Embodiment 1, the skirt portion 29 further extends from the pressure attachment portion 30 and is brought into direct contact with the step portion 16 of the shielding shell 15. That is, although the pressure attachment portion 30 is usually formed as the end portion of the grommet 27, in this embodiment, a channel through which water infiltrates inside the grommet 27 is elongated by extending the skirt portion 29, which also enhances water resistance.

Furthermore, there is a concern that the sealing lips 36 are likely to be deteriorated by receiving the fastening force by the flange 50. As a measure taken against such a problem, in this embodiment, the auxiliary lips 37 are formed outside the region to be fastened, such that a constant sealing force is also obtained at that region. Accordingly, it is possible to maintain a constant sealing function for a long period of time.

Embodiment 2

Figure 10:
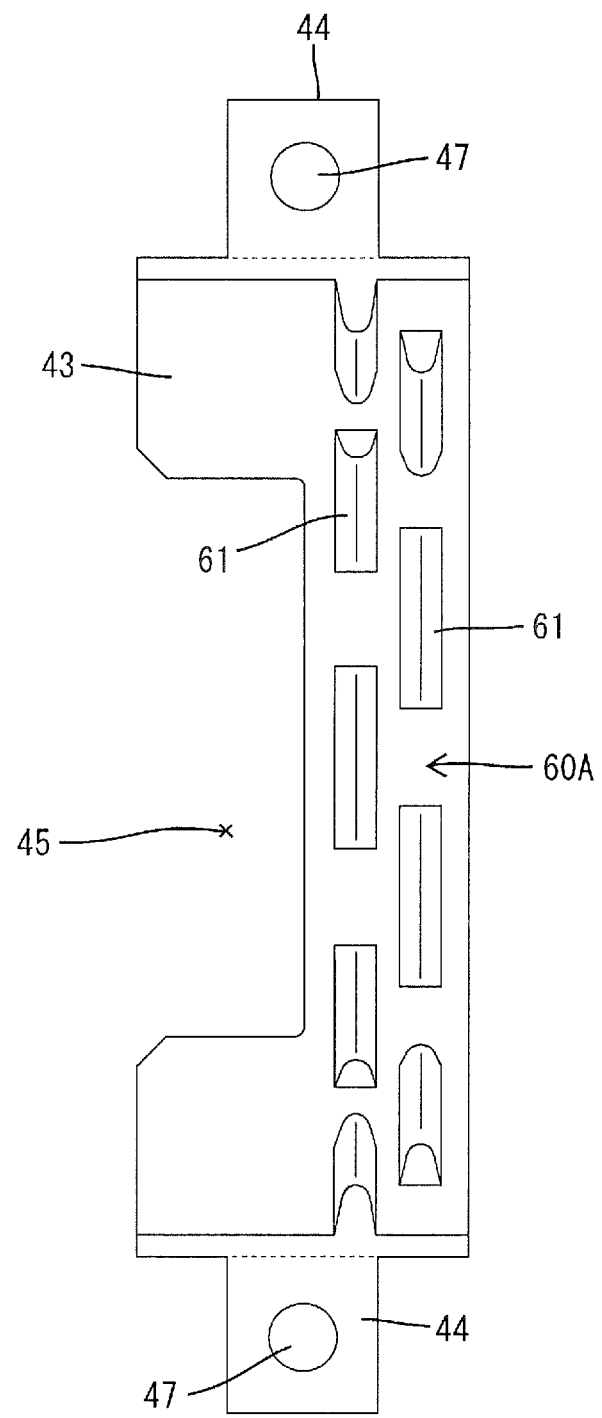
FIG. 10 is a bottom view of a grommet protection member according to Embodiment 2.

FIG. 10 shows Embodiment 2 of the present invention. FIG. 10 shows the inner surface of a segment 60A of a grommet protection member according to Embodiment 2. In Embodiment 1, the flange 50 was shown to have a form continuous for the entire length of both segments 60A. In Embodiment 2, however, the flange 61 is divided into a plurality of segments longitudinally (circumferentially) at certain intervals in a staggered arrangement of two adjacent rows, one in the front and one in the rear, such that the segments of the flange 61 overlap each other in the front-rear direction.

Although each row of the flange 61 is arranged to have breaks in the circumferential direction, the overlapping positional relationship between the front and rear rows creates a condition in which they press against the sealing lips of the grommet along the entire circumference thereof without a break.

The configuration is otherwise identical with Embodiment 1, such that identical effects to those of Embodiment can be exerted.

OTHER EMBODIMENTS

The present invention is not limited to the embodiment explained by the above description and the drawings. Other embodiments, which will be explained below, for example, are also included in the technical scope of the present invention.

Although, in the above-described embodiment, a configuration was shown in which the flange 50 was provided with a uniform height along their entire circumference, the height may not have to be uniform. For example, if the grommet protection member 42 is elongated in the width direction (vertical direction as seen in FIG. 8), there is a concern that the pressing force against the grommet is reduced in the central portion compared with that in the end portions. In such a case, the flange 50 may be formed to have a height gradually increasing from both ends in the width direction to the central portion in order to provide a uniform sealing pressure.

Although, in the above-described embodiment, the grommet protection member 42 was made of a synthetic resin, it may be made of metal.

Although, in the above-described embodiment, a configuration in which the skirt portion 29 extended from the grommet 27 was shown, the skirt portion 29 may not have to be provided. Rather, the pressure attachment portion 30 may form the longitudinal end portion.

Although, in the above-described embodiment, the grommet protection member 42 was divided into the two independent segments 42A, the segments 42A may be connected with a hinge at one end so that they can be opened and closed and may be provided with link portions only on the other end. In that case, the means for fastening the link portions is not limited to a bolt and a nut. A clip provided on one link portion and a hole provided in the other will be sufficient, and various other forms of such elastic locking means can also be contemplated.

Although, in the above-described embodiment, the auxiliary lips 37 were provided on the grommet 27, they may be omitted. Localized pressure is applied to the shielding shell 15 on the grommet 27 immediately below the flange 50. Accordingly, if a sufficient sealing function is exerted in this region, the sealing lips 36 may be omitted.

The invention claimed is:

1. A grommet protection member configured to be attached to an end portion of a grommet made of a soft material, the grommet being configured to come into direct contact with an outer circumferential surface of an attachment member, wherein:
   the grommet protection member is made of a material that is harder than the soft material of the grommet and is attached to surround, from an outer circumferential surface side, an end portion of the part of the grommet that is fitted to the attachment member,
   a flange is integrally formed on an inner circumferential surface of the grommet protection member projecting therefrom, the flange compressing the grommet along an entire outer circumference of the grommet, wherein the flange compresses the grommet at a portion having a circumference that is narrower than a circumference of a main portion of the grommet, and
   the grommet protection member defines a first planar portion and a second planar portion, the flange projecting from a center portion of the grommet protection member between the first planar portion and the second planar portion to form a peak, the peak extending radially inward with regard to the first planar portion and the second planar portion, and the grommet protection member contacting the grommet only at the peak.

2. The grommet protection member according to claim 1, wherein the grommet protection member is provided with a drain opening for draining water entering between the grommet protection member and the grommet.

3. The grommet protection member according to claim 1, wherein the grommet protection member includes (i) a pair of segments that is divided in a radial direction in at least one location so as to be capable of being opened, and (ii) link portions at open ends of the two segments for linking the segments to each other such that the segments can be held in an annular shape that can surround the outer circumferential surface of the grommet.

4. The grommet protection member according to claim 3, wherein the grommet protection member comprises two separate segments that are divided in the radial direction at two locations together with the flange, and the link portions linking the two segments are formed at the two divided locations, and
   upon attachment to the grommet, the two segments are joined together so that the flange continues circumferentially.

5. The grommet protection member according to claim 4, wherein both of the segments have an identical shape.

6. The grommet protection member according to claim 5, wherein the link portions are formed on both end portions of both of the segments such that the segments can be linked together by fastening screws.

7. An electric wire connection device, comprising:
   an attachment member including, at one end, a tubular connecting portion that has an opening through which electric wires can be inserted and, on an other end, an attached portion capable of being attached to an attachment destination member;
   a grommet made of a soft material and formed into a tubular shape, the grommet covering the attachment member in direct contact therewith; and
   the grommet protection member according to claim 1 that surrounds the part of the grommet covering the attachment member, the grommet protection member integrally including the flange that compresses the entire outer circumferential surface of the grommet.

8. The electric wire connection device according to claim 7, wherein sealing lips are formed circumferentially on an inner circumferential surface side of the grommet that opposes the attachment member, the sealing lips being capable of coming into direct contact with an outer circumferential surface of the attachment member, and upon attachment to the grommet, the sealing lips being positioned in a portion immediately below the flange.

9. The electric wire connection device according to claim 8, wherein auxiliary lips are provided circumferentially on the inner circumferential surface side of the grommet outside of a region tightened by the flange, the auxiliary lips being provided in locations between which the sealing lips are interposed in a front-rear direction.

* * * * *